US011433355B2

(12) United States Patent
Greenizen et al.

(10) Patent No.: US 11,433,355 B2
(45) Date of Patent: Sep. 6, 2022

(54) FILTRATION CLAMP WITH OPTIONAL ALIGNMENT COLLAR AND FILTRATION SYSTEM

(71) Applicant: EMD Millipore Corporation, Burlington, MA (US)

(72) Inventors: Kurt E. Greenizen, Burlington, MA (US); Christopher A. Scott, Burlington, MA (US); Paul Sydlowski, Burlington, MA (US); John Doyle, Burlington, MA (US); Ryan A. Amara, Burlington, MA (US)

(73) Assignee: EMD Millipore Corporation, Burlington, MA (US)

( * ) Notice: Subject to any disclaimer, the term of this patent is extended or adjusted under 35 U.S.C. 154(b) by 147 days.

(21) Appl. No.: 16/094,237

(22) PCT Filed: Apr. 20, 2017

(86) PCT No.: PCT/US2017/028485
§ 371 (c)(1),
(2) Date: Oct. 17, 2018

(87) PCT Pub. No.: WO2017/192269
PCT Pub. Date: Nov. 9, 2017

(65) Prior Publication Data
US 2019/0111395 A1 Apr. 18, 2019

Related U.S. Application Data

(60) Provisional application No. 62/332,031, filed on May 5, 2016.

(51) Int. Cl.
*B01L 9/00* (2006.01)
*B01D 63/08* (2006.01)
(Continued)

(52) U.S. Cl.
CPC .............. *B01D 63/08* (2013.01); *B01L 3/508* (2013.01); *B01L 9/50* (2013.01); *B25B 5/04* (2013.01);
(Continued)

(58) Field of Classification Search
CPC .............. B01L 9/50; B01L 2300/0681; B01D 2313/06; B25B 5/003; B25B 5/04; B25B 5/06; B25B 5/08
See application file for complete search history.

(56) References Cited

U.S. PATENT DOCUMENTS

| 2,397,438 A | 3/1946 | Schmid |
| 3,215,456 A | 11/1965 | Schmid |

(Continued)

FOREIGN PATENT DOCUMENTS

| BE | 613310 A1 | 5/1962 |
| CN | 101242971 A | 8/2008 |

(Continued)

OTHER PUBLICATIONS

Japanese communication, with English translation, dated Aug. 20, 2019 in corresponding Japanese patent application No. 2018-557002.

(Continued)

*Primary Examiner* — Jill A Warden
*Assistant Examiner* — Dwayne K Handy
(74) *Attorney, Agent, or Firm* — Nields, Lemack & Frame, LLC

(57) ABSTRACT

A clamp including a first jaw member having a camming surface, a second jaw member pivotable with respect to the first jaw member, a first biasing member biasing the first and second jaw members to a first position; and a locking mechanism that includes a cam or roller for cooperating with the camming surface of the jaw member, and a second (Continued)

biasing member biasing the cam or roller against the camming surface to lock the first and second jaw members in a second position. An optional alignment collar can be used to align components of the filtration apparatus prior to clamping. Filtration apparatus including the clamp, and also optionally including the alignment collar, is also disclosed.

18 Claims, 15 Drawing Sheets

(51) Int. Cl.
    *B25B 5/04*     (2006.01)
    *B25B 5/08*     (2006.01)
    *B25B 5/06*     (2006.01)
    *B01L 3/00*     (2006.01)
    *B25B 5/14*     (2006.01)
    *G01N 1/40*     (2006.01)
    *B25B 7/14*     (2006.01)

(52) U.S. Cl.
    CPC .............. *B25B 5/06* (2013.01); *B25B 5/08* (2013.01); *B25B 5/14* (2013.01); *G01N 1/4077* (2013.01); *B01D 2313/06* (2013.01); *B01L 2300/0681* (2013.01); *B25B 7/14* (2013.01); *G01N 2001/4088* (2013.01)

(56) References Cited

U.S. PATENT DOCUMENTS

| | | |
|---|---|---|
| 3,261,243 A | 7/1966 | Ellison |
| 3,596,543 A | 8/1971 | Green |
| 4,301,010 A | 11/1981 | Eddelman et al. |
| D380,145 S | 6/1997 | Rumpel |
| D416,789 S | 11/1999 | Pernu et al. |
| D438,453 S | 3/2001 | Nelson et al. |
| 6,240,815 B1 | 6/2001 | Huang |
| D447,564 S | 9/2001 | Stewart, Jr. |
| 7,314,331 B1 | 1/2008 | Koros et al. |
| 7,556,229 B2 | 7/2009 | Elliott et al. |
| 7,798,333 B2 | 9/2010 | Zuk |
| 8,157,104 B2 | 4/2012 | Kane et al. |
| 8,677,865 B2 | 3/2014 | Buchanan et al. |
| 8,978,897 B2 | 3/2015 | Cai et al. |
| D750,476 S | 3/2016 | Huang |
| D792,971 S | 7/2017 | Greenizen et al. |
| 2004/0216286 A1 | 11/2004 | Dixon |
| 2006/0257203 A1 | 11/2006 | Iida |
| 2007/0187881 A1 | 8/2007 | Dixon |
| 2008/0098861 A1 | 5/2008 | Engvall et al. |
| 2008/0276766 A1 | 11/2008 | Phillips et al. |
| 2009/0183547 A1 | 7/2009 | Battenfeld et al. |
| 2010/0038303 A1 | 2/2010 | Cai et al. |
| 2010/0066001 A1 | 3/2010 | Dixon |
| 2015/0214685 A1 | 7/2015 | Buennigmann |

FOREIGN PATENT DOCUMENTS

| | | |
|---|---|---|
| CN | 202133578 U | 2/2012 |
| CN | 102580376 A | 7/2012 |
| CN | 202620830 U | 12/2012 |
| CN | 103203128 A | 7/2013 |
| CN | 101432101 B | 9/2014 |
| CN | 104841194 A | 8/2015 |
| CN | 204725351 U | 10/2015 |
| CN | 204745793 U | 11/2015 |
| DE | 1187437 B | 2/1965 |
| DE | 2552519 A1 | 5/1977 |
| DE | 3502815 A1 | 7/1986 |
| DE | 202012102499 U1 | 8/2012 |
| FR | 1405604 A | 7/1965 |
| GB | 1229277 A | 4/1974 |
| JP | 2-3373 U | 1/1990 |
| JP | 2001-18565 A | 1/2001 |
| JP | 2003-74522 A | 3/2003 |
| JP | 3105650 U | 11/2004 |
| JP | 3721380 B1 | 11/2005 |
| JP | 4597687 B2 | 12/2010 |
| JP | 2012-56046 A | 3/2012 |
| TW | M452040 U1 | 5/2013 |

OTHER PUBLICATIONS

Chinese communication, with English translation, dated Aug. 3, 2021 in corresponding Chinese patent application No. 201780027820.1.

European communication dated Dec. 5, 2019 in corresponding European patent application No. 17793000.5.

Chinese communication, with English translation, dated Dec. 27, 2019 in corresponding Chinese patent application No. 201780027820.1.

International Search Report and Written Opinion dated Sep. 8, 2017 in corresponding PCT application No. PCT/US17/28485.

Japanese communication, with English translation, dated Jun. 8, 2021 in corresponding Japanese patent application No. 2020-141059.

FILTRATION CLAMP WITH OPTIONAL ALIGNMENT COLLAR AND FILTRATION SYSTEM

This application claims priority of provisional application Ser. No. 62/332,031 filed May 5, 2016, the disclosure of which is hereby incorporated by reference.

BACKGROUND

The embodiments disclosed herein generally relate to filtration devices and particularly to vacuum filtration devices for filtering liquids from one container through a membrane and depositing the filtrate directly into another container. More particularly, certain embodiments relate to a liquid-tight, closed filtration system and method in which solutions, such as tissue culture media, are vacuum filtered.

Numerous laboratory devices have been developed to carry out filtration, in order to concentrate, separate and/or purify laboratory samples. Researchers routinely need to concentrate their sample prior to other investigative research. Devices for filtering biological solutions, for example, generally involve a membrane filter interposed between two vessels, a feed container or reservoir located upstream of the membrane for holding the sample solution to be filtered, and a filtrate container located downstream of the membrane filter for collecting the filtered sample solution. Often a vacuum is applied downstream of the membrane as a driving force to increase the rate of filtration by creating a pressure differential across the membrane filter.

Several device designs have been made for filtering a feed liquid into a filtrate container. These are typically used to clarify and sterilize biological solutions, such as fetal calf serum, tissue culture media and the like. In certain conventional devices, the user transfers the feed liquid from a storage vessel to the filter device. Vacuum filtration systems such as the STERICUP® system commercially available from EMD Millipore are suited for sterile filtration of cell culture media, buffers and reagents. This device can handle a maximum unfiltered volume of 1 liter based on the size of the feed funnel. Large volumes can be processed continuously, as determined by the volume of the feed and filtrate storage vessels.

The arrangement of components for vacuum filtration can take various forms; however, especially in laboratory settings, ease of use, reduced storage requirements and minimal disposable hardware are important concerns as is avoiding spillage of the biological solution. In certain other applications, preserving the sterility of the solution being filtered is also important.

Conventional systems include an open container such as a funnel for receiving a sample of solution to be filtered arranged to be sealed to the top of a bottle, flask, or the like for collecting filtrate. The base of the container includes a membrane filter positioned such that when the sample to be filtered is poured into the top of the container, all of the sample solution is directed to flow through the membrane filter. A vacuum source may be placed in communication with the apparatus and allows a vacuum to be drawn within the filtrate bottle or flask, thereby driving filtration by drawing the sample solution through the membrane filter. Since the pressure differential across the filter is constant due to the application of the vacuum on the downstream side of the filter and atmospheric pressure present on the liquid surface of the open container, rapid filtration is possible.

Such conventional products include a clamp that clamps and seals a membrane filter, such as a cut disc membrane filter, between a glass/metal filter base and a glass/metal funnel during the vacuum filtration process. The clamp is available in multiple sizes to accommodate a range of available filter discs. The conventional clamp assembly includes two stamped anodized aluminum jaws, fastened together with a stainless steel hinge pin secured by snap rings. Clamp force is achieved via a torsion spring assembled over the hinge pin. The legs of the spring are compressed between the clamp handles, providing a pre-load force to the clamp jaws.

The primary function of such a vacuum filtration clamp is to clamp the funnel to the filter base with sufficient force to seal the membrane against leakage during filtration. In addition, the clamp must produce enough clamping force to provide a secure connection between the funnel and base without movement or slippage. The clamping force needed for a secure connection is much higher than that needed to seal against leakage, thus traditional clamps utilize a single torsion spring with a force rating high enough to accommodate both. As a result of employing a single torsion spring with such a high force rating, the design of the clamp requires large handles capable of actuating the spring which in turn are difficult to control, offer multiple pinch points to the user, are cumbersome, and can affect the stability of the assembly in several ways. For example, the size of the handles upsets the balance of the filtration apparatus when the clamp is in place, which can cause the apparatus to fall over. This can result in breakage and loss of sample.

It therefore would be desirable to provide a clamp for a filtration device that eliminates the drawbacks of the prior art.

SUMMARY

Problems of the prior art have been addressed by embodiments disclosed herein. In certain embodiments, a clamp is provided wherein the force requirements for the clamp are separated, utilizing a bimodal approach to clamp operation. In certain embodiments, a biasing member, such as a torsion spring, with a force high enough to achieve an initial membrane seal but low enough to allow ease of control is used, and a secondary locking mechanism is used to provide, for example, the additional force necessary to secure components together, such as, for example, one filtration member (e.g., a funnel) to another (e.g., a filter holder). In certain embodiments, a locking mechanism allows for variations in assembly tolerance by employing a biasing member such as a compression spring to allow the locking mechanism to "float" yet still provide additional clamping force. In certain embodiments, the additional force is achieved using a rotating locking tab which employs a "cam" mechanism mounted inside a jaw member of the clamp. The cam, when actuated such as by rotating the locking tab, interacts with a corresponding "ramp" located on the underside of the other jaw member resulting in an interference fit which produces additional force on that jaw. For example, the cam may be located on the underside of the lower jaw, and when rotated, interacts with a corresponding ramp located on the underside of the upper jaw, resulting in the interference fit which produces additional downward force on the upper jaw. In another embodiment, one or more rollers is provided instead of the ramp, for cooperating with the caroming surface. A biasing member biasing the roller(s) against the camming surface to lock the first and second jaw members in a second position.

As a result of reducing the initial operational force, the clamp actuating members or handles can be greatly reduced in size, resulting in better stability of the assembly, single hand operation, and removal of hazardous pinch points. In certain embodiments, the clamp is reusable.

DETAILED DESCRIPTION

Figure 1:
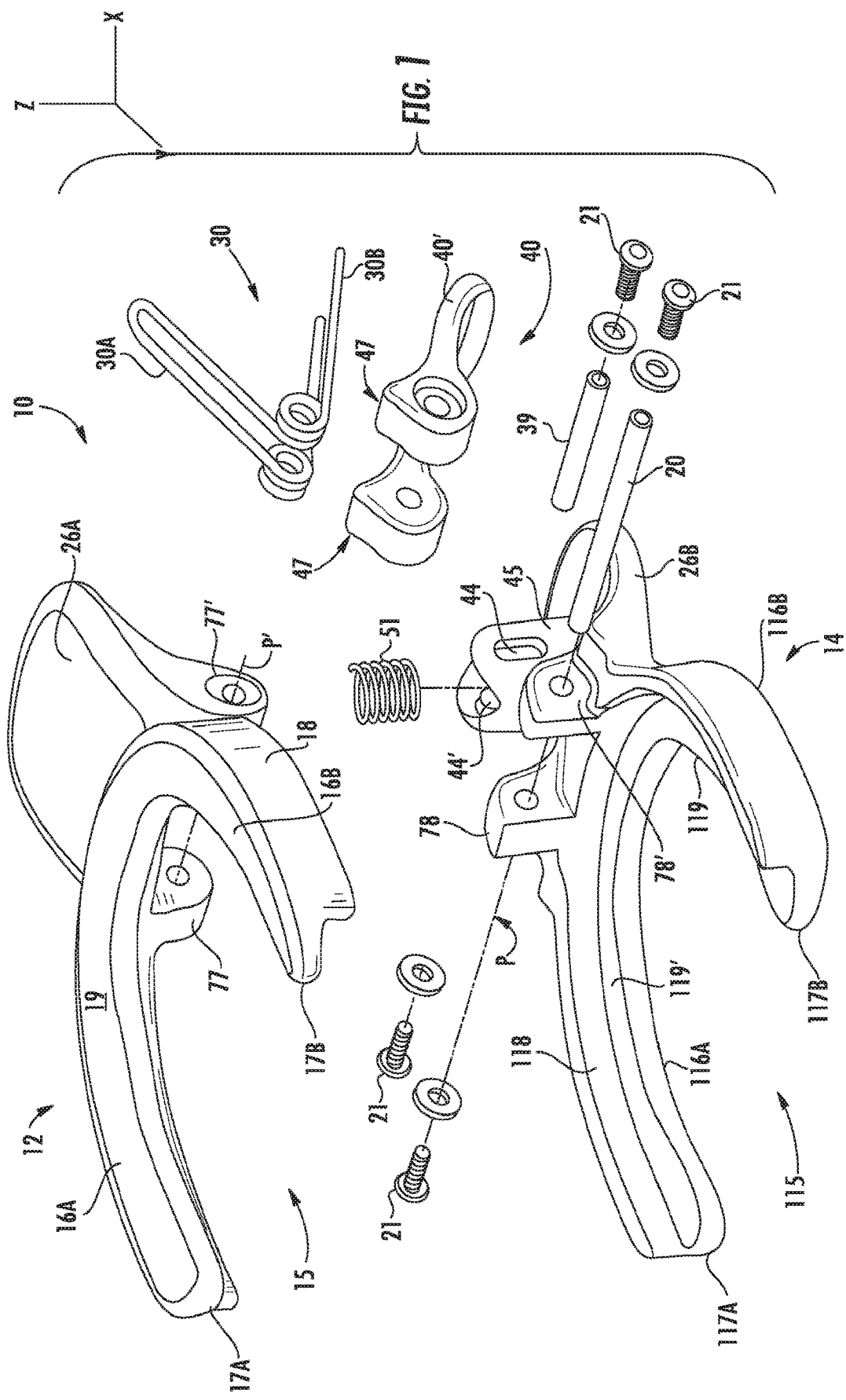
FIG. 1 is an exploded view of a clamp in accordance with certain embodiments.

A more complete understanding of the components, processes and apparatuses disclosed herein can be obtained by reference to the accompanying drawings. The figures are merely schematic representations based on convenience and the ease of demonstrating the present disclosure, and is, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawing, and are not intended to define or limit the scope of the disclosure. In the drawing and the following description below, it is to be understood that like numeric designations refer to components of like function.

The singular forms "a," "an," and "the" include plural referents unless the context clearly dictates otherwise.

As used in the specification, various devices and parts may be described as "comprising" other components. The terms "comprise(s)," "include(s)," "having," "has," "can," "contain(s)," and variants thereof, as used herein, are intended to be open-ended transitional phrases, terms, or words that do not preclude the possibility of additional components.

It should be noted that many of the terms used herein are relative terms. For example, the terms "upper" and "lower" are relative to each other in location, i.e. an upper component is located at a higher elevation than a lower component, and should not be construed as requiring a particular orientation or location of the structure.

The terms "top" and "bottom" are relative to an absolute reference, i.e. the surface of the earth. Put another way, a top location is always located at a higher elevation than a bottom location, toward the surface of the earth.

Figure 2:
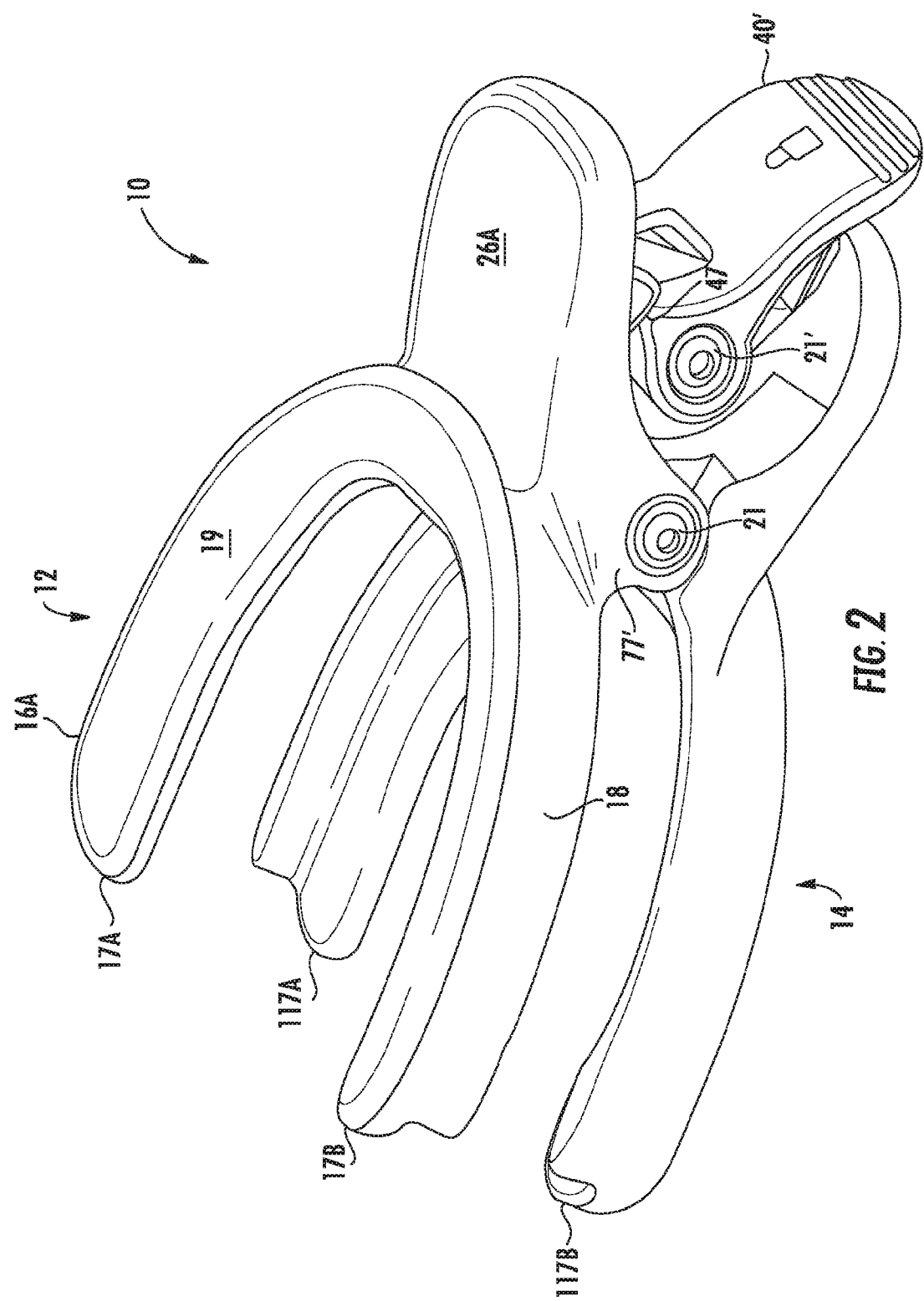
FIG. 2 is a perspective view of a clamp in accordance with certain embodiments.
Figure 7:
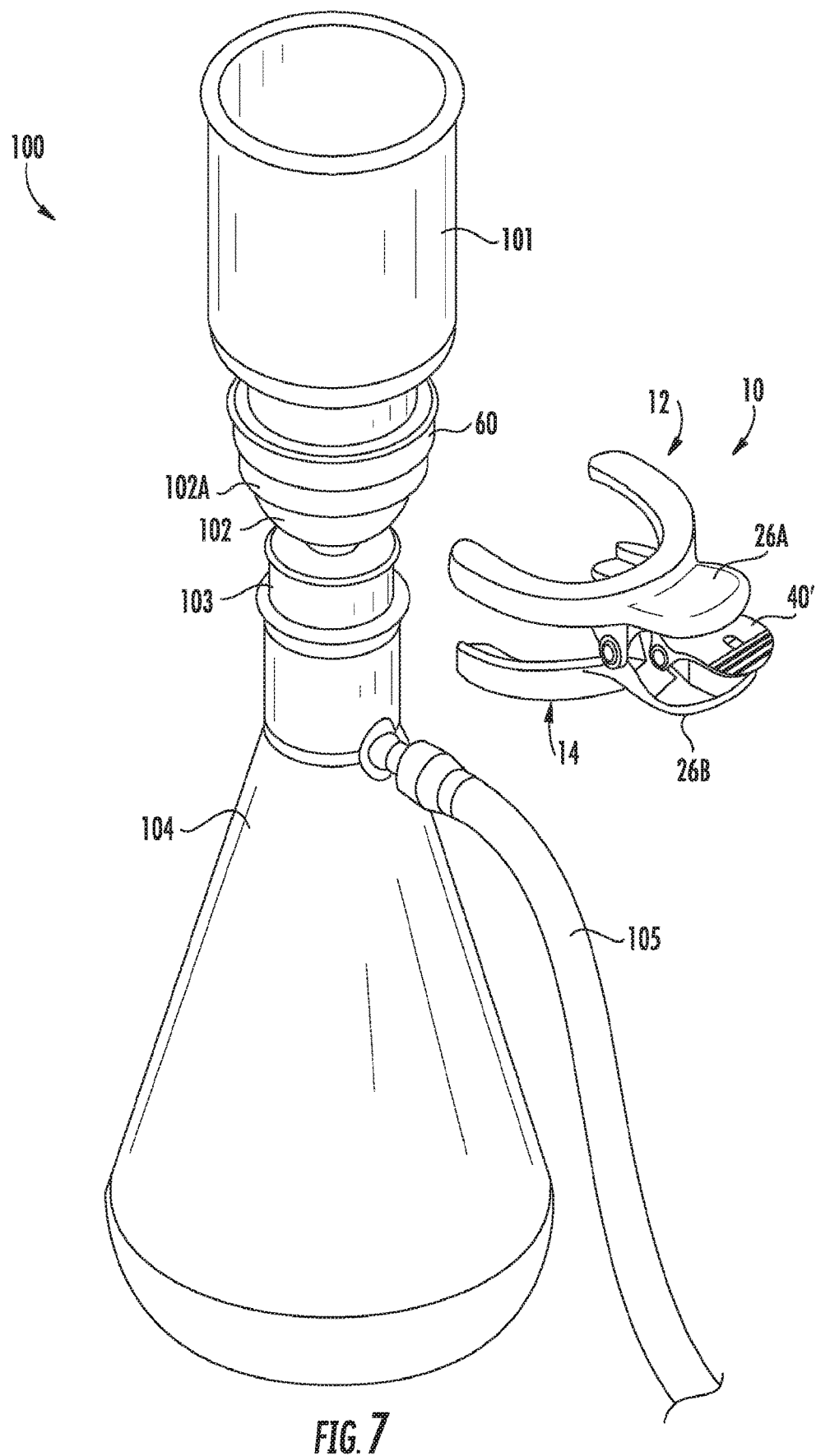
FIG. 7 is perspective view of a filtration apparatus and a clamp in accordance with certain embodiments.
Figure 8:
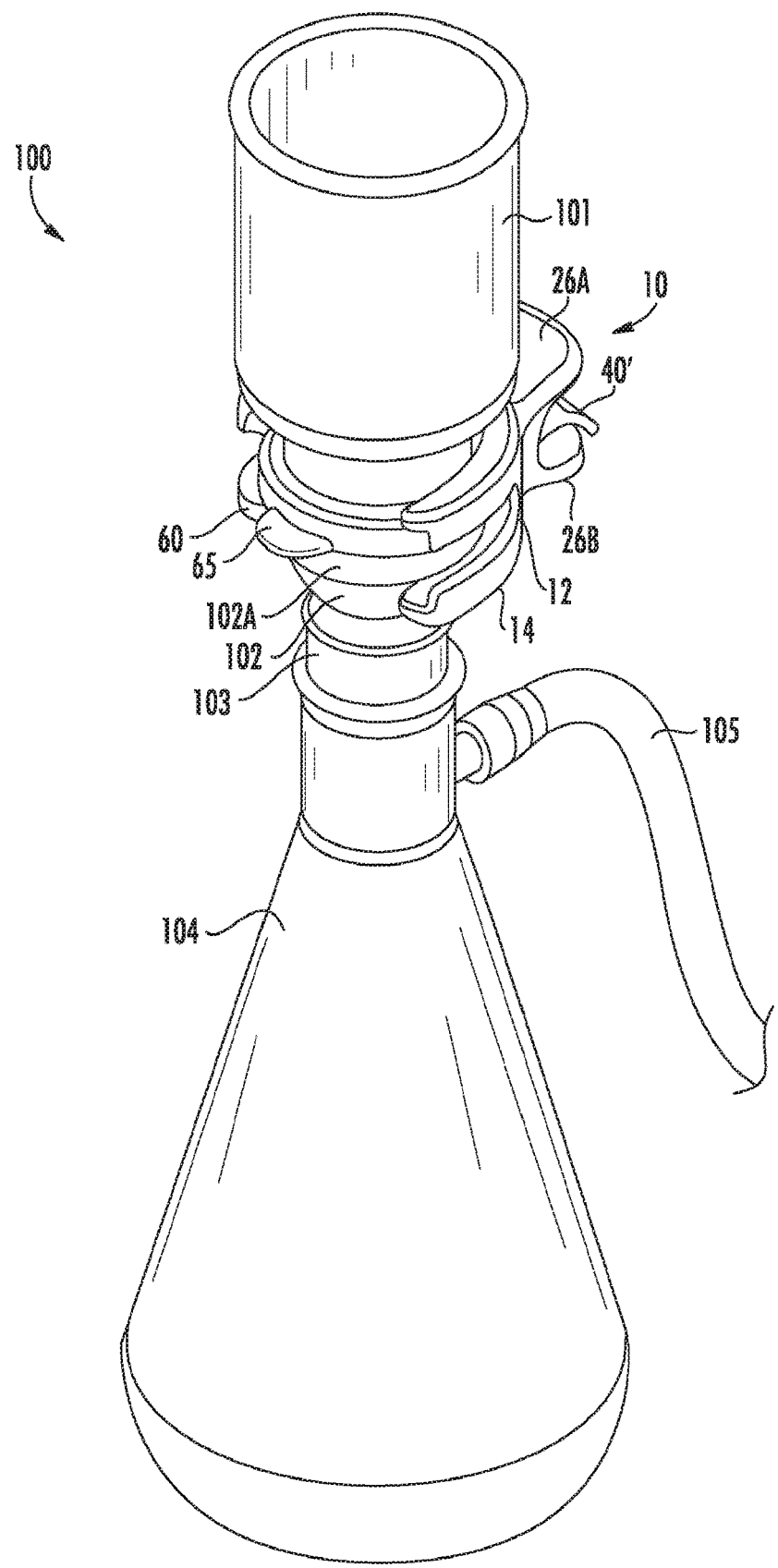
FIG. 8 is a perspective view of a filtration apparatus with an engaged clamp in accordance with certain embodiments.

Turning first to FIGS. 1 and 2, there is shown a clamp member 10 in accordance with certain embodiments. Suitable materials of construction of the clamp member 10 are within the skill in the art, and include cast aluminum, stamped aluminum, stainless steel, and rigid high strength plastic such as reinforced Nylon. The clamp member 10 includes a first jaw member 12 and a second jaw member 14 pivotable with respect to the first jaw member 12. In certain embodiments, the first jaw member 12 includes a container receiving region 15 defined by two spaced arm members 16A, 16B, the region 15 being configured to receive, for example, the neck or flange of a first filtration member such as a container, funnel or flask 101 (FIG. 7). In certain embodiments, the region 15 is generally U-shaped. In certain embodiments, the arm members 16A, 16B are co-extensive, each terminating in a respective free end 17A, 17B, and include a side wall 18 that extends vertically downwardly from top surface 19. In some embodiments, the arm members 16A, 16B are a continuous single integral unit. In certain embodiments, the lower end of a filtration funnel 101, for example, to which the clamp 10 may be attached, has an annular flange 101A (FIG. 9) that when occupying the region 15, fits between the side wall 18 and the underside of the arm members 16A, 16B (opposite the top surface 19), allowing the first jaw member 12 to securely engage the filtration funnel 101.

Figure 9:
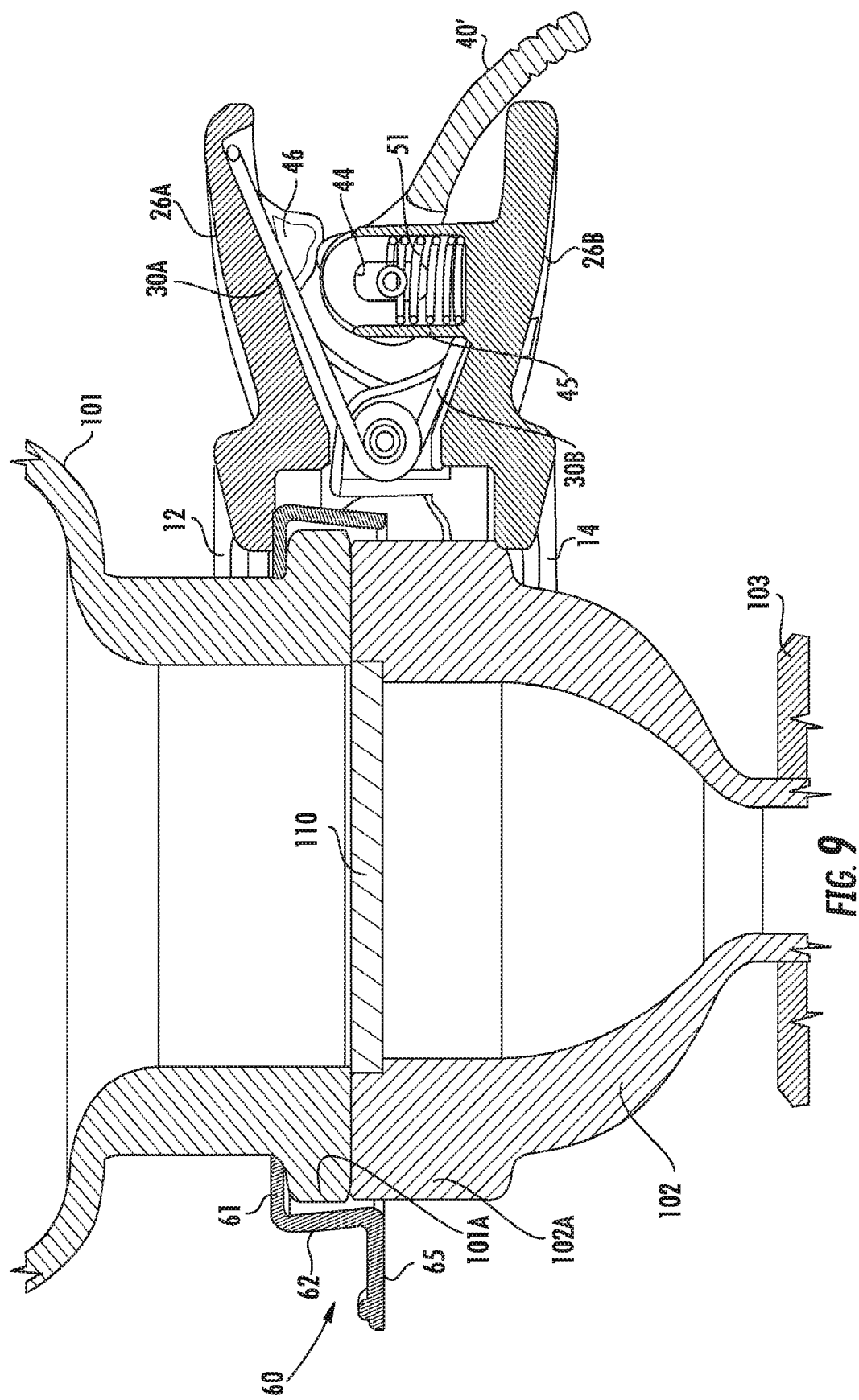
FIG. 9 is a cross-sectional view of an alignment collar and clamp assembled to filtration apparatus in accordance with certain embodiments.

Similarly, in certain embodiments the second jaw member 14 includes a container receiving region 115 defined by two spaced arm members 116A, 116B, the region 115 being configured to receive, for example, the neck or flange of a first filtration member such as a container, funnel or flask 104 (FIG. 9). In certain embodiments, the region 115 is generally U-shaped. In certain embodiments, the arm members 116A, 116B are co-extensive, each terminating in a respective free end 117A, 117B, and include a side wall 118 that extends vertically upwardly from bottom surface 119. In some embodiments, the arm members 116A, 116B are a continuous single integral unit. In certain embodiments, the upper end of a filter holder 102, for example, to which the clamp 10 may be attached, has an annular flange 102A that when occupying the region 115, fits between the side wall 118 and the top side 119' (opposite the bottom surface 119) of the arm members 116A, 116B, allowing the second jaw member 14 to securely engage the filter holder 102.

When the clamp is engaged with the filtration funnel 101 and filter holder 102 as shown in FIG. 9, it presses the two components together and ensures a liquid tight seal is maintained through the membrane positioned between the filtration funnel 101 and the filter holder 102.

Figure 10:
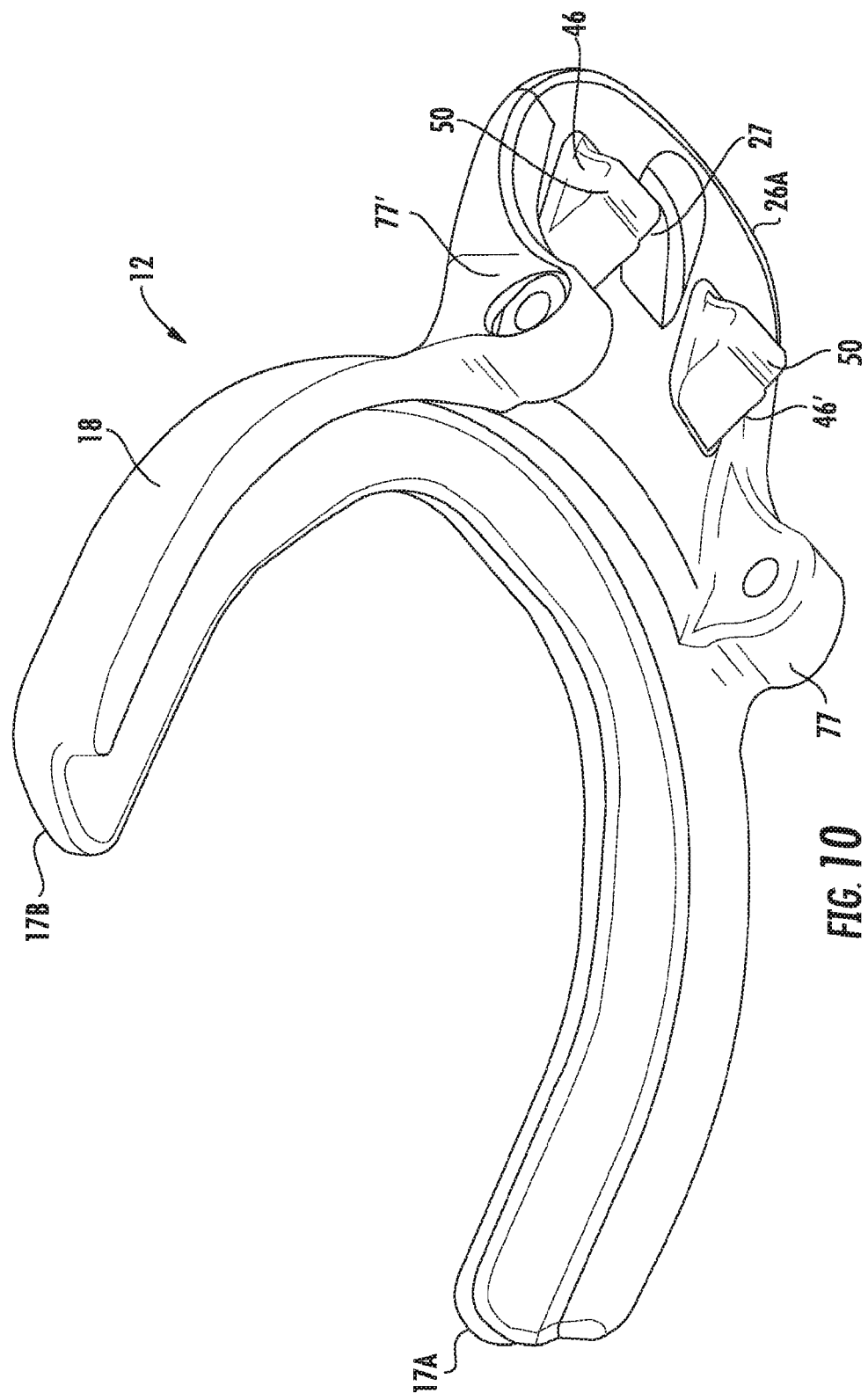
FIG. 10 is a perspective view of a first jaw of a clamp in accordance with certain embodiments.

In certain embodiments, the first and second jaw members 12, 14 are pivotally connected such that they pivot with respect to one another about a pivot axis P defined by a pin 20 or the like supported in ears 77, 77' of first jaw member (FIG. 10) and ears 78, 78' of second jaw member 14. The pin 20 can be secured in place by fasteners 21, such as screws and washers, or the like. The range of pivoting includes a clamp resting or normally closed (i.e., unclamped) position, an engaging or release position wherein the clamp 10 is actuated either to engage a container or to be released therefrom, thereby separating the jaw members 12, 14, and a clamped position wherein the clamp 10 is fixed to a container in a clamping (and sealing) position. In certain embodiments, the clamped position is an intermediate position between the normally closed position and the engaging or release position. In certain embodiments, in the engaging or release position, the spacing between free end 17A and free end 117A, and the spacing between free end 17B and free end 117B, is the largest; that is, the clamp 10 is in its most open position.

Figure 11:
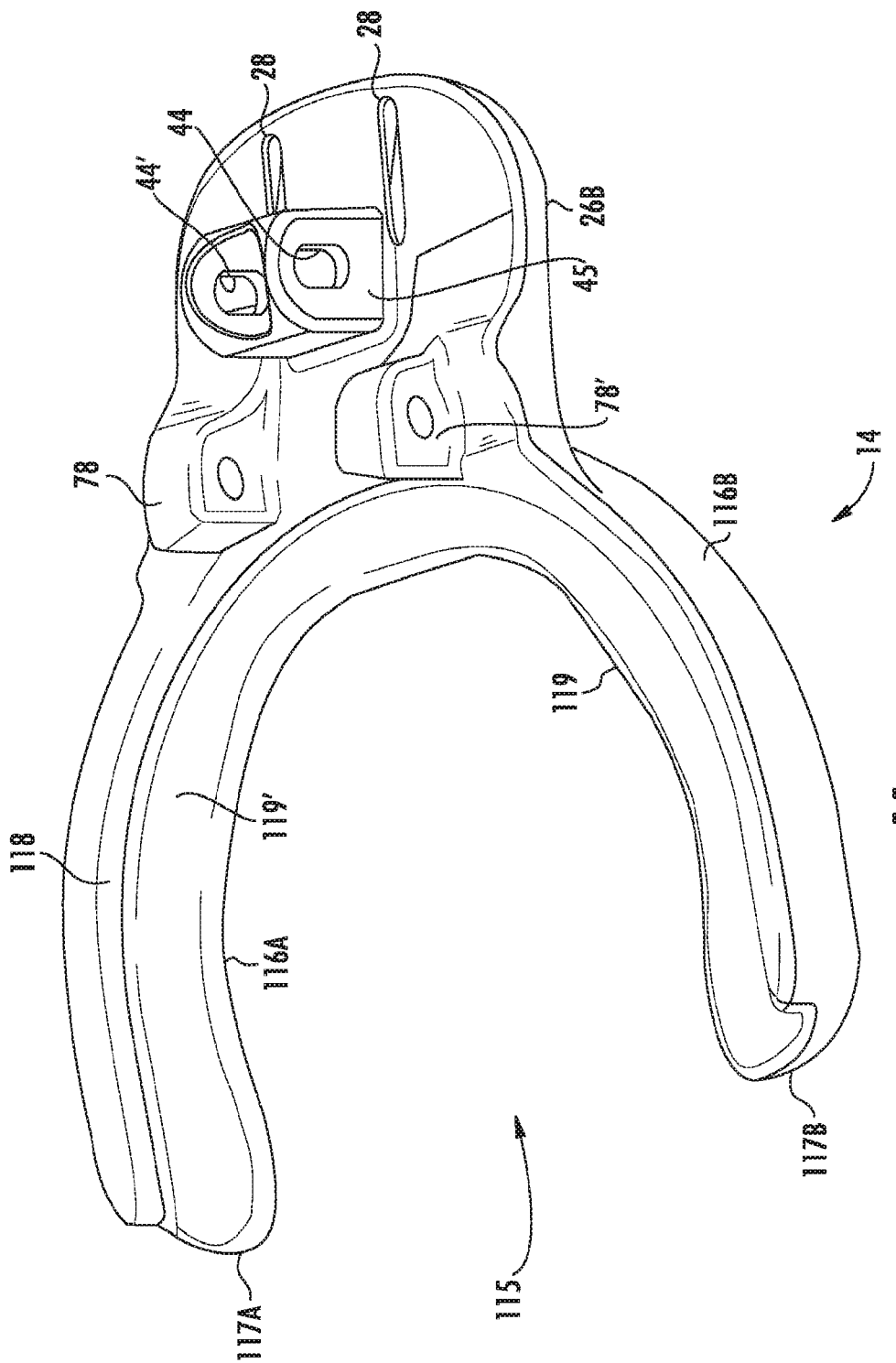
FIG. 11 is a perspective view of a second jaw of a clamp in accordance with certain embodiments.

In certain embodiments, the first and second jaw members 12, 14 each also include a respective actuating member, such as a respective tab 26A, 26B. In certain embodiments, the tab 26A and first jaw member 12 is an integral piece, as is the tab 26B and the second jaw member 14. The tabs 26A, 26B facilitate actuation of the clamp 10 by the user, as the application of a downward force on tab 26A coupled with an upward force on tab 26B causes one or both of the first and second jaw members 12, 14 to pivot about the pivot axis P. A biasing member 30, such as a torsion spring, can be wound about the pin 20 with legs 30A and 30B configured and positioned to bias against the underside of each tab 26A, 26B, respectively. The underside of tab 26A may include a feature such as a groove 27 or the like to receive and retain the leg 30A (FIG. 10), and the underside of tab 26B may include a feature such as spaced slots 28 or the like to receive and retain the leg 30B (FIG. 11). The biasing member 30 is chosen to have sufficient force to achieve the initial membrane seal when the clamp 10 is in the assembled position. The force of the biasing member 30 should also be low enough to allow ease of control; that is, to allow compression of tabs 26A, 26B manually, preferably simply with a user's thumb and index finger, for example, to open the clamp 10 and maintain it in an open position while manipulating it to engage (or disengage) from the filtration apparatus.

In certain embodiments, the first jaw member 12 pivots with respect to the second jaw member 14 in a first direction along the z-axis, and the second jaw member 14 pivots with respect to the first jaw member 12 in a second, opposite direction along the z-axis. In an alternative embodiment, one of the first or second jaw members 12, 14 may be kept stationary, and the other of the first or second jaw members 12, 14 may pivot with respect to the stationary jaw member.

Figure 3:
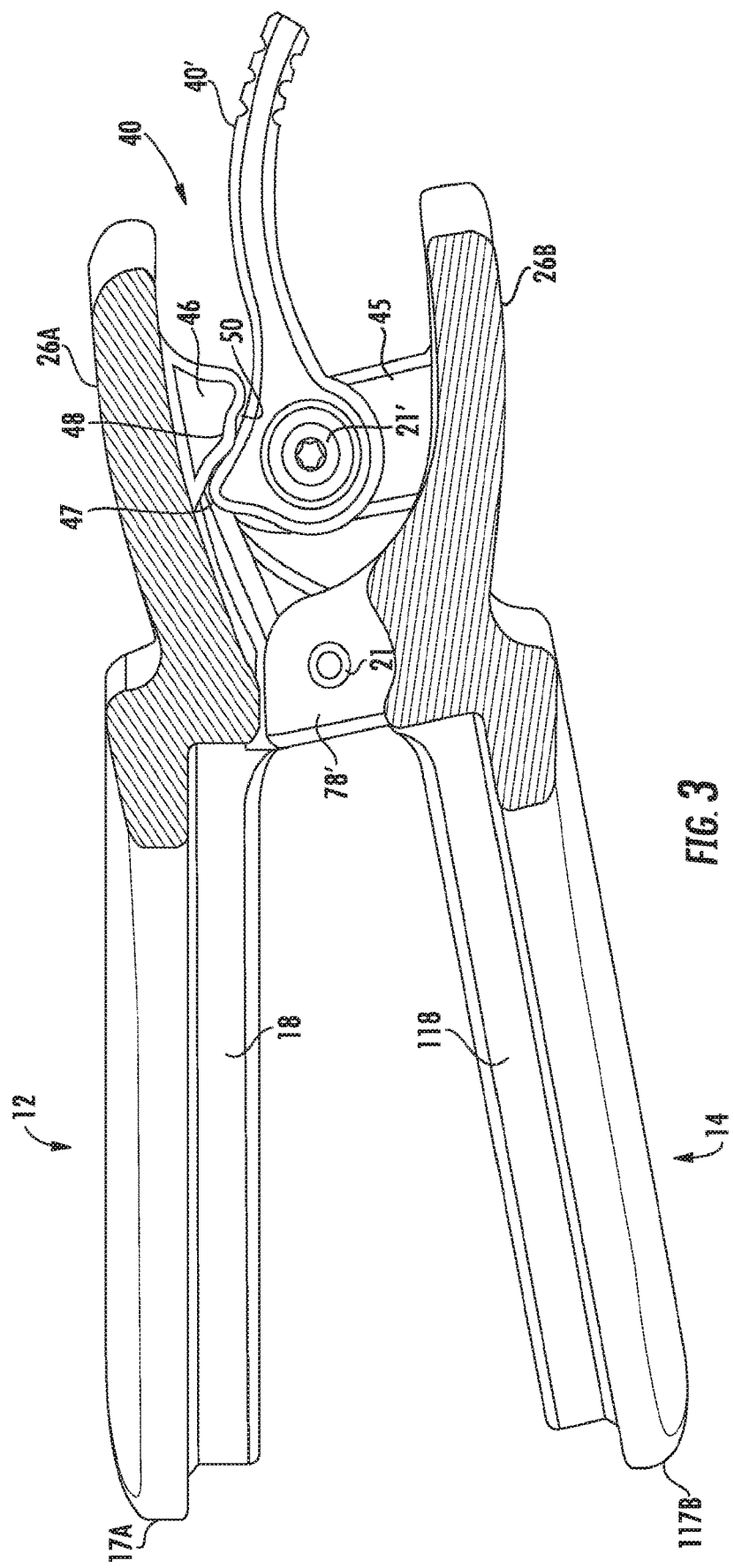
FIG. 3 is a first cross-sectional view of the clamp of FIG. 1 in accordance with certain embodiments.

As can be seen in FIG. 3, in certain embodiments, the clamp member 10 includes a locking mechanism 40 that creates an upward force biasing the first jaw member 12 towards its clamping position, further ensuring that the filter or membrane is sealed between the container and the filter holder or base, for example. In certain embodiments, the locking mechanism 40 includes a lever 40' and is pivotable about a pivot axis P' defined by a shaft or pin 39 that is held by fasteners 21' or the like in spaced slots 44, 44' of hub 45 on the upper surface of tab 26B. The shaft of pin 39 floats in slots 44, 44', and is biased towards the top of the slot 44 by biasing member 51 as discussed in greater detail below. One or more ramps 46 extends from the underside of tab 26A, and has a surface 48 configured as a ramp or caroming surface that cooperates with one or more cams 47 on the lever 40'. The number of ramps 46 preferably equals the number of cams 47, each cam 47 being associated with and cooperating with a respective ramp 46. In certain embodiments, there are two spaced ramps 46, 46' (FIG. 10) and two similarly spaced cams 47. In some embodiments each caroming surface includes a small notch 50 into which the cam 47 slides, providing tactile feedback to the user that the locking mechanism 40 is in its locked and fully biasing position. Biasing member 51, such as a compression spring, may be housed in hub 45 to bias the locking mechanism against the tab 26A of the first jaw member 12, adding to the clamping force of the device. In certain embodiments, the biasing member 51 is preloaded, and actuation of the locking mechanism from its unlocked to its locked position even further loads the biasing member 51.

Those skilled in the art will appreciate that the locking mechanism 40 alternatively could cooperate with the second jaw member 14 in a similar manner.

Figure 5:
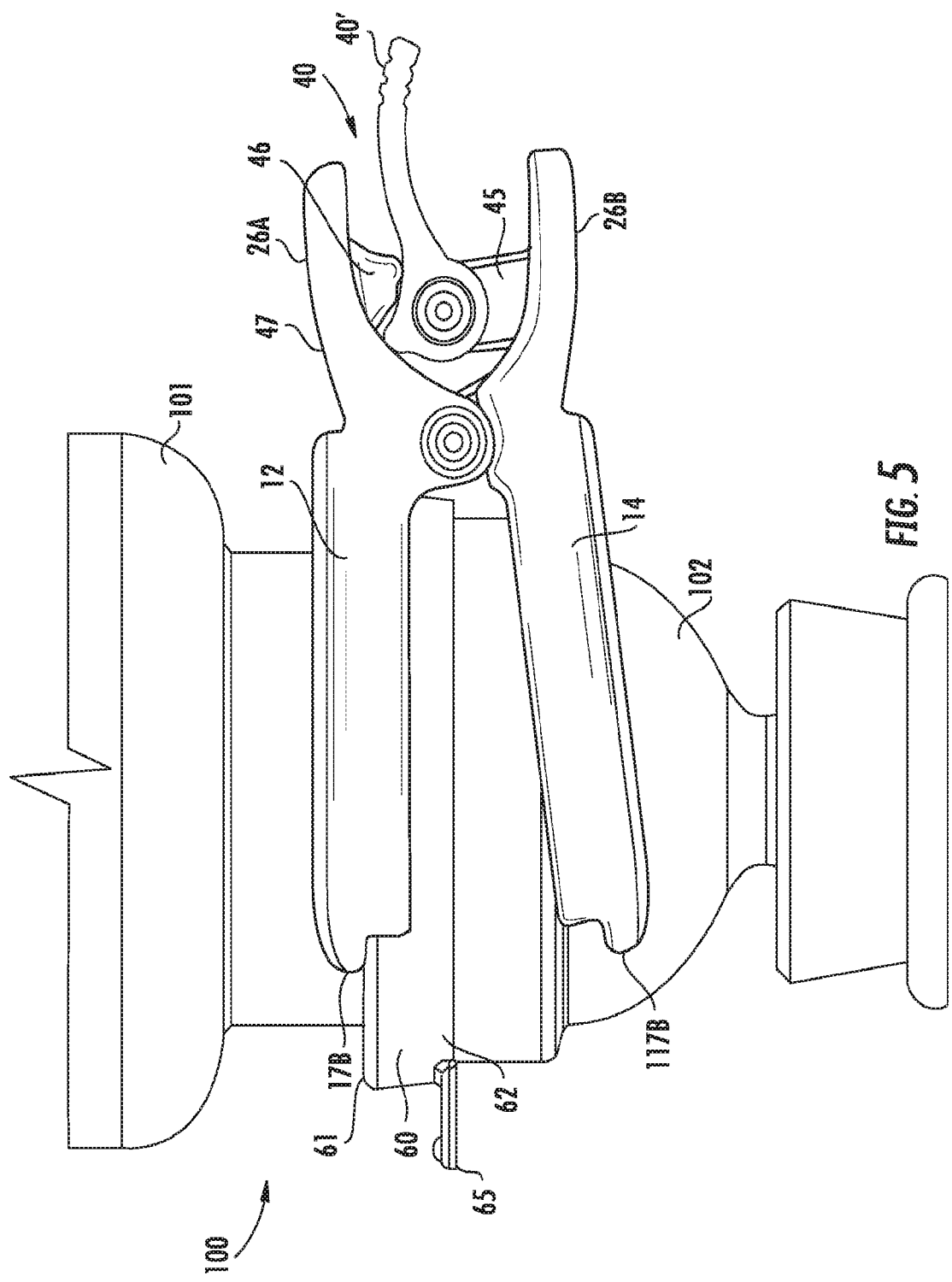
FIG. 5 is a side view of a clamp in an engaging position, engaging a filtration apparatus in accordance with certain embodiments.

FIG. 3 illustrates the locking mechanism 40 in its unlocked position, with the cam 47 displaced from the notch 50 of the ramp 46. In this position, the free end 17A is maximally spaced from free end 117A, and free end 17B is maximally spaced from free end 117B. FIG. 5 shows the clamp 10 in this position, engaging a filtration apparatus 100. In the embodiment shown, the first jaw member 12 engages a filtration funnel 101, and the second jaw member 14 engages a filter holder 102.

Figure 4:
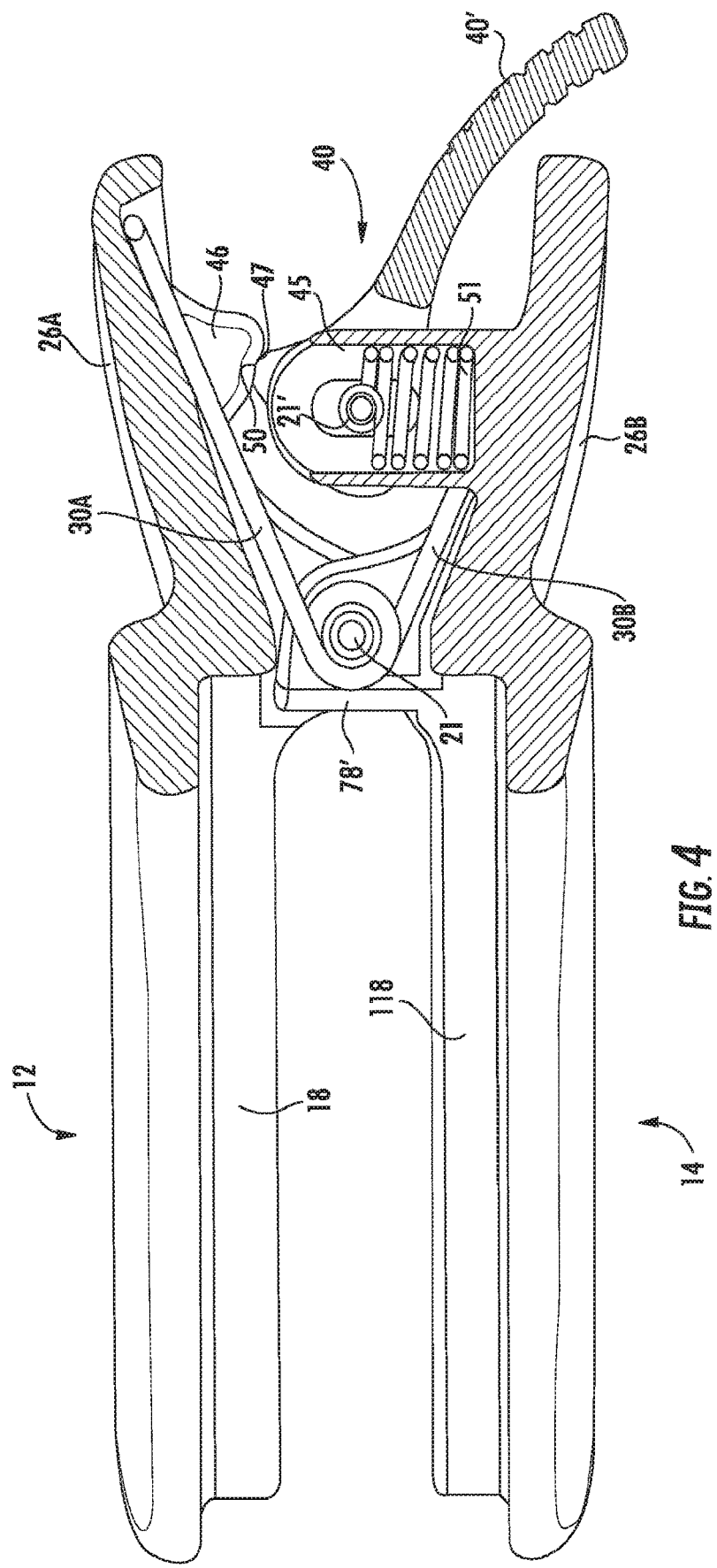
FIG. 4 is a second cross-sectional view of the clamp of FIG. 1 in accordance with certain embodiments.
Figure 6:
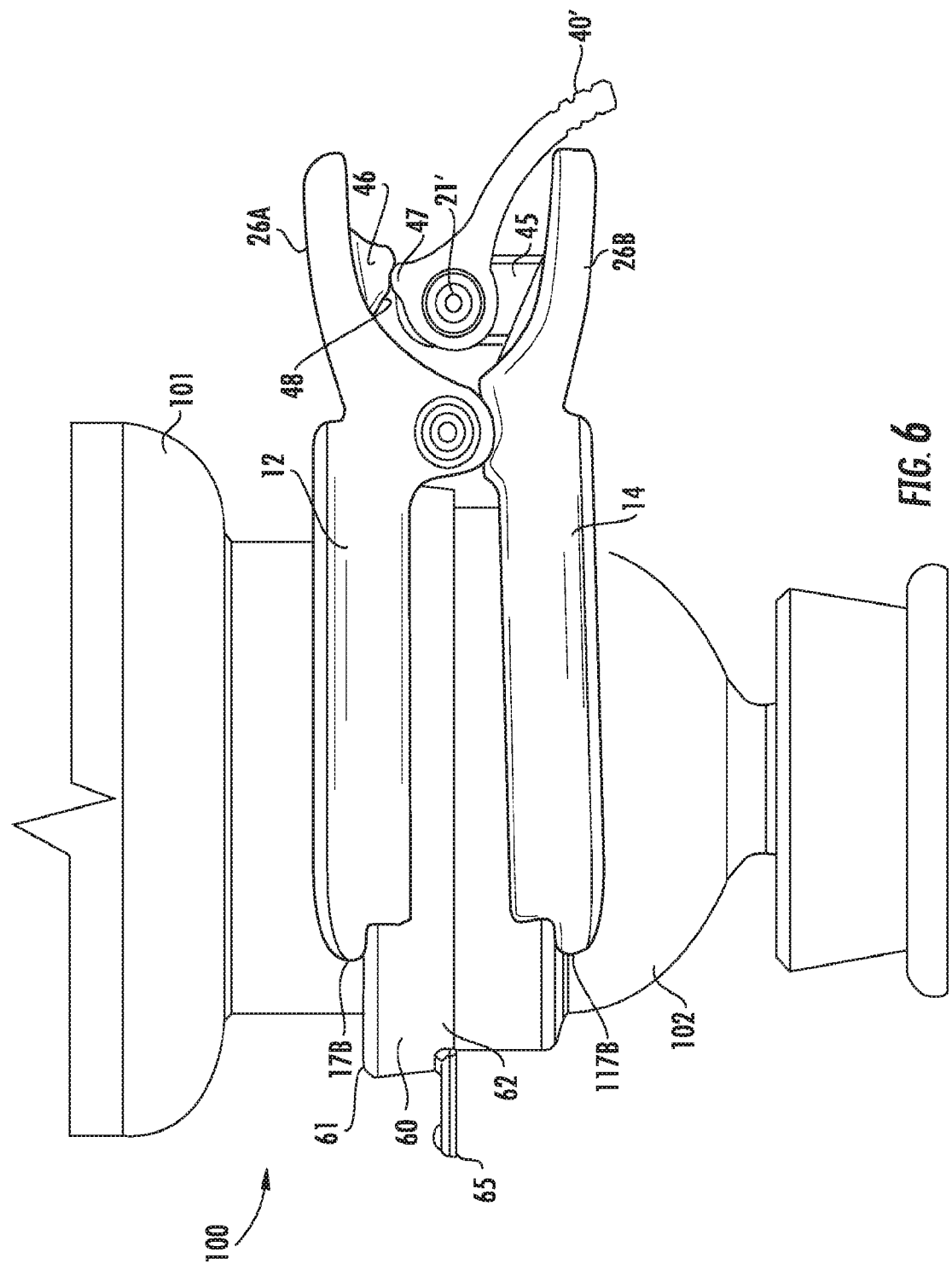
FIG. 6 is a side view of a clamp in a locked position, engaging a filtration apparatus in accordance with certain embodiments.

FIG. 4 illustrates the locking mechanism in its locked position, with the cam 47 positioned in the notch 50 of the ramp 46. In this position, the biasing member 51 biases forces the cam 47 against the ramp 46, thereby providing additional clamping force to the first jaw member 12. As can be seen in FIGS. 3 and 4, the lever 40' is actuated from the unlocked position shown in FIG. 3 to the locked position shown in FIG. 4 to lock the clamp 10. FIG. 6 shows the clamp 10 in this position, engaging a filtration apparatus 100. In the embodiment shown, the first jaw member 12 engages a filtration funnel 101, and the second jaw member 14 engages a filter holder 102. A filter, such as a cut disc membrane 110 (FIG. 9), may be positioned and sealed between the filtration funnel 101 and the filter holder 102. Suitable filter sizes include 25 mm, 47 mm and 90 mm, for example, which are typical in the industry.

Figure 13:
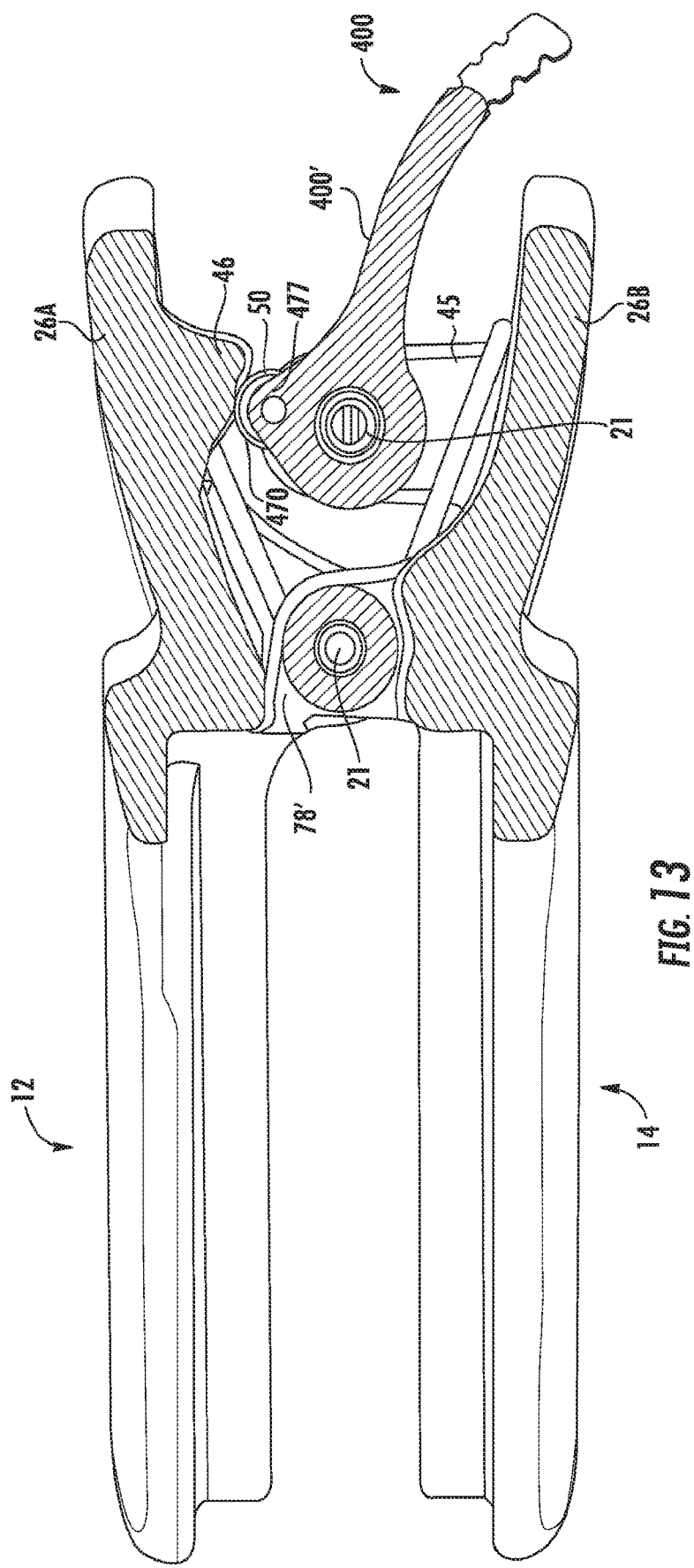
FIG. 13 is a cross-sectional view of a clamp showing an alternative embodiment of a locking mechanism.
Figure 14:
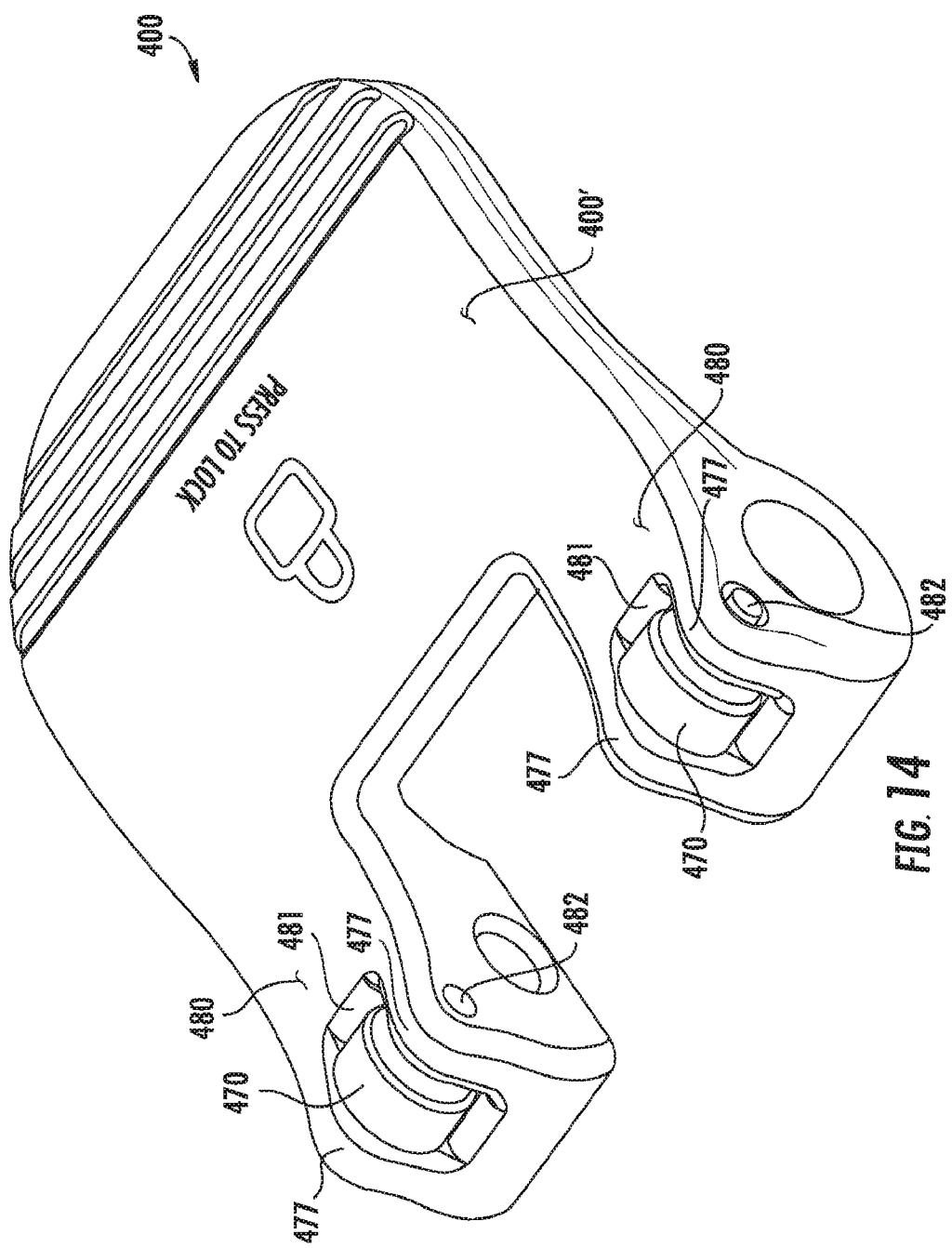
FIG. 14 is a first perspective view of an alternative embodiment of a locking mechanism.
Figure 15:
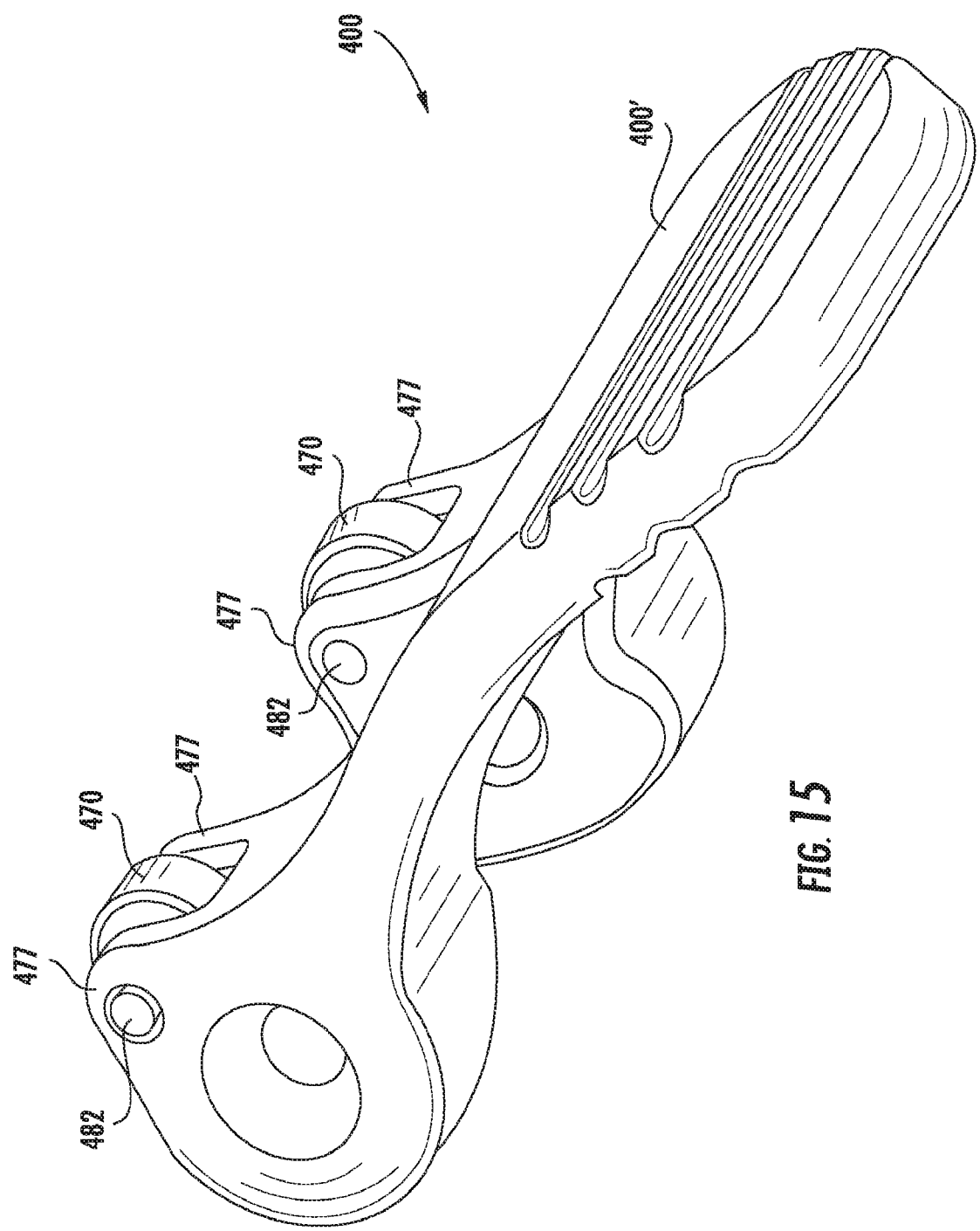
FIG. 15 is a second perspective view of an alternative embodiment of a locking mechanism.

FIGS. 13-15 illustrate another embodiment of a locking mechanism that results in one or more of reduced wear, reduced particulate generation, improved tactile response and smoother operation. In certain embodiments, the locking mechanism 400 includes a lever 400' and like locking mechanism 40, is pivotable about a pivot axis P' defined by a shaft or pin 39 (FIG. 1) that is held by fasteners 21' or the like in spaced slots 44, 44' of hub 45 on the upper surface of tab 26B. In certain embodiments, instead of spaced cams, the locking mechanism 400 includes spaced rollers 470. Each roller 470 is housed in an arm 480 that extends from the lever 400'. Each roller 470 sits in a cavity 481 formed in each arm 480, and is rotatable about a pivot axis defined by pin 482 or the like, such as a stainless steel dowel pin press fit or otherwise supported in ears 477 of arm 480. As can be seen in FIG. 15, the rollers 470 are positioned so that they extend out of the cavity 481 higher than the top of the ears 477, thereby providing an exposed roller surface for engagement with the respective caroming surfaces of the tab 26A.

Suitable materials of construction for the rollers 470 include stainless steel, hard rubber or plastic such as Acetal, PTFE or other hard, lubricious plastic. In certain embodiments, each roller 470 freely rotates in its respective cavity 480. In other embodiments, interference is created such as between each roller 470 and its respective cavity 480, so that rotation of the roller is restrained (but not completely eliminated) to achieve a more secure lock when the locking mechanism is in the locked position.

In certain embodiments, misalignment of the filter disc during assembly of the filtration apparatus can be minimized or avoided with the use of a flexible collar member 60, best seen in FIGS. 5, 6 and 9. Conventionally, filtration apparatus is typically assembled by placing a filter disc 110 (FIG. 9) on a filter holder 102, and then visually aligning the filtration funnel 101 with the filter holder 102 while applying a clamp without disrupting that alignment. This process requires two hands to accomplish, and can be difficult in view of the force necessary to operate conventional clamps. Accordingly, a flexible collar member 60 may be used to facilitate alignment and enhance stability of filtration components. In certain embodiments, the collar 60 is a ring member 61 having an annular skirt 62 that projects downwardly from the ring member 61. The annular skirt 62 is configured to contact the filter holder 102 so that it holds it in place with respect to the funnel 101. A suitable material of construction for the collar 60 is silicone. In certain embodiments, the collar 60 may include a radially extending tab 65 to facilitate handling of the collar 60 by the user, and to create a stop that inhibits rolling of the assembly when placed horizontally on a substrate such as a laboratory benchtop. The collar 60 also may serve to keep contaminants off of the sealing/flowpath surfaces, and protect the components (especially glass components) from breakage.

In certain embodiments, as shown in FIG. 9, the collar 60 may be assembled to the flange 101A of the funnel 101 so that the annular skirt 62 extends below the bottom surface of the flange 101A and engages the flange 102A of the filter holder, thus providing an alignment feature for assembly to the filter holder 102, and reducing metal on glass contact during assembly. When the clamp 10 is to be applied to the filtration apparatus 100, the first jaw member 12 engages the ring member 61 of collar member 60 as seen in FIGS. 5 and 9. Since the collar member 60 serves to stabilize the apparatus, the clamp 10 can be applied with one hand, without having to hold or otherwise secure the filtration apparatus 100.

Figure 12:
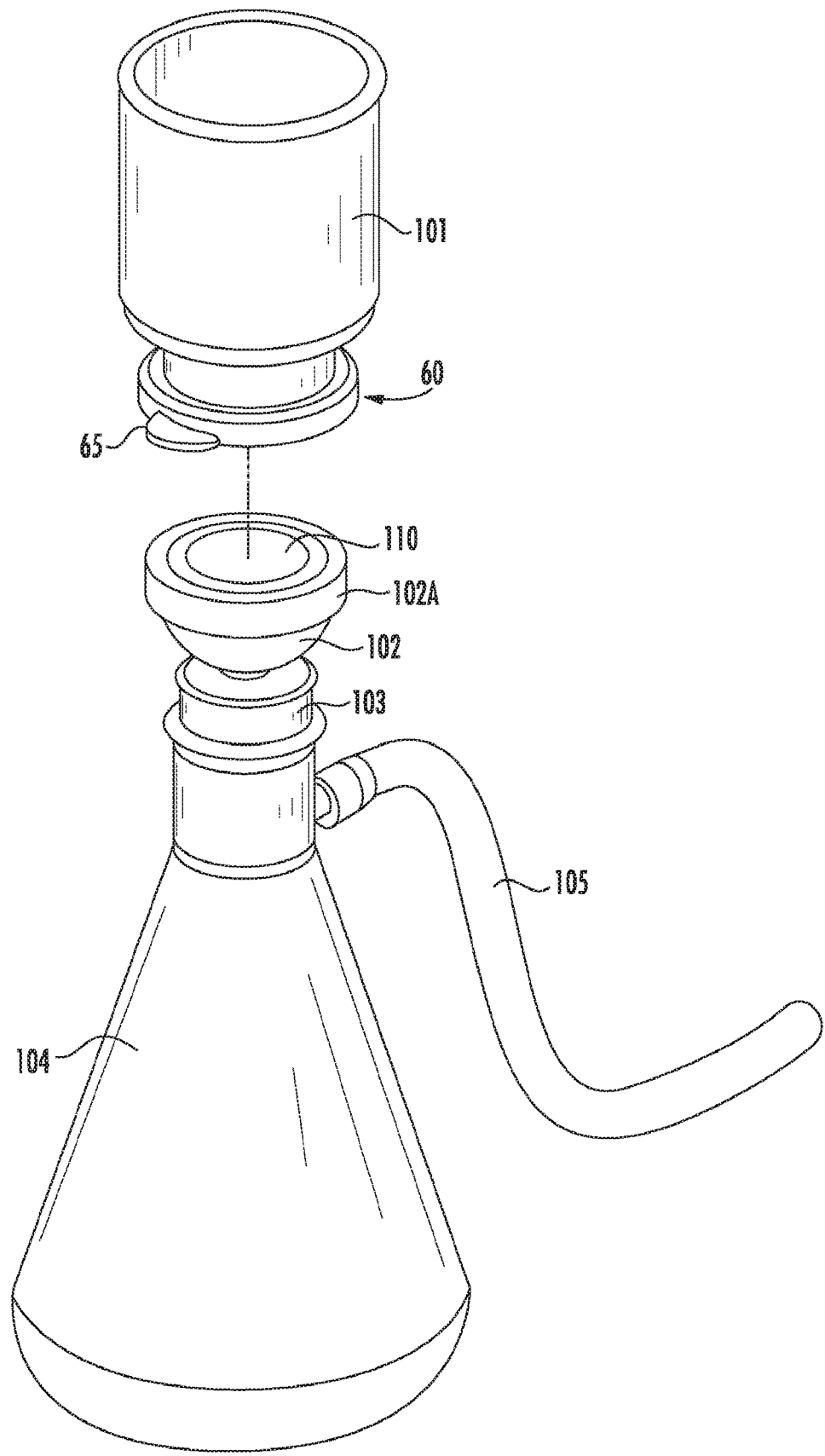
FIG. 12 is a partially exploded view, in perspective, of a filtration apparatus with an alignment collar in accordance with certain embodiments.

FIG. 7 illustrates a filtration apparatus 100 in a state where it is about to be clamped with clamp member 10. In the embodiment shown, the filtration apparatus 100 includes a funnel 101, a filter holder 102, a filter (not shown) supported on the filter holder 102, a rubber stopper 103, a flask 104, and a hose 105 for connection to a source of vacuum (not shown). The filter is placed on the filter holder 102 (typically made of glass), and the funnel (optionally pre-assembled with the collar 60 in place, see FIG. 12) is properly aligned with the filter holder 102, with the filter holder 102 supported by the flask 104, for example. Since the skirt 62 of the collar member 60 engages the flange 102A of the filter holder 102, the proper alignment is maintained, and the funnel/filter holder combination is now a stable unit. The first and second jaws 12, 14 of the clamp 10 are actuated to the engaging position, where the first and second jaw members 12, 14 are separated to their maximal amount. The clamp 10 is then positioned about the filtration apparatus, with the first jaw member 12 engaging the collar member 60 (or the flange on the filtration funnel 101 when the collar member 60 is not used), and the second jaw member 14 engaging the flange 102A on the filter holder 102. Lever 40' is depressed, securing the clamp 10 to the filtration apparatus 100. Vacuum filtration can now be commenced.

Applications include filtration of aqueous solutions, organic solvents and organic solvent mixtures, aqueous organic mixtures. Filtration can be carried out for solution clarification when the filtrate is of interest, and concentration and separation when the retentate is of interest. For example, clarification can include the preparation of aqueous buffers for HPLC analysis, which requires solvent clarification to remove particles that might have been present in salts used to prepare buffers. Unremoved particles can and will destroy HPLC columns. Regarding separation, in many cases of chemical synthesis, the compound of interest requires purification. Re-crystallization can be used. Precipitated material needs to be separated from the liquid. Membrane based filtration is often used in the separation process by pulling the liquid through the membrane and leaving the substance of interest (retentate) on the membrane surface.

While various aspects and embodiments have been disclosed herein, other aspects, embodiments, modifications and alterations will be apparent to those skilled in the art upon reading and understanding the preceding detailed description. The various aspects and embodiments disclosed herein are for purposes of illustration and are not intended to be limiting. It is intended that the present disclosure be construed as including all such aspects, embodiments, modifications and alterations insofar as they come within the scope of the appended claims or the equivalents thereof.

What is claimed is:

1. A clamp, comprising:
a first jaw member having a camming surface;
a second jaw member pivotable with respect to said first jaw member;
a first biasing member biasing said first and second jaw members towards a clamping position; and
a locking mechanism comprising a cam for cooperating with said camming surface, and a second biasing member biasing said cam against said camming surface, whereby actuation of said locking mechanism biases said first and second jaw members to said clamping position and locks said first and second jaw members in said clamping position.

2. The clamp of claim 1, wherein said camming surface comprises a notch for receiving said cam to provide tactile feedback to a user indicating that said locking mechanism is in a locking position.

3. The clamp of claim 1, wherein said first jaw member comprises a first tab for actuating said first jaw member, and wherein said second jaw member comprises a second tab for actuating said second jaw member.

4. The clamp of claim 3, wherein said second tab supports said second biasing member.

5. The clamp of claim 3, wherein said first tab comprises said camming surface.

6. The clamp of claim 1, wherein said cam engages said camming surface in an interference fit which produces a force on said first jaw.

7. The clamp of claim 1, wherein said first jaw member has two camming surfaces, and said locking mechanism comprises two spaced cams, each said spaced cam cooperating with a respective one of said two camming surfaces.

8. A filtration apparatus comprising:
a sample container;
a filter;
a filter holder supporting said filter;
a collection container;
a flexible alignment collar securing said filter to said filter holder, said flexible alignment collar comprising a ring member having an annular skirt that projects downwardly from said ring member, said annular skirt being configured to contact said filter holder so that it holds said filter holder in place with respect to said sample container; and
a clamp securing the sample container to the filter holder by engaging said flexible alignment collar.

9. The filtration apparatus of claim 8, wherein said clamp comprises:
a first jaw member having a camming surface;
a second jaw member pivotable with respect to said first jaw member;
a first biasing member biasing said first and second jaw members towards a clamping position; and
a locking mechanism comprising a cam for cooperating with said camming surface, and a second biasing member biasing said cam against said camming surface, whereby actuation of said locking mechanism biases said first and second jaw members to said clamping position and locks said first and second jaw members in said clamping position.

10. The filtration apparatus of claim 9, wherein said camming surface comprises a notch for receiving said cam to provide tactile feedback to a user indicating that said locking mechanism is in a locking position.

11. The filtration apparatus of claim 8, wherein said clamp comprises:
a first jaw member having a camming surface;
a second jaw member pivotable with respect to said first jaw member;
a first biasing member biasing said first and second jaw members to a first position; and
a locking mechanism comprising a roller for cooperating with said camming surface, and a second biasing member biasing said roller against said camming surface to lock said first and second jaw members in a second position.

12. The filtration apparatus of claim 11, wherein said camming surface comprises a notch for receiving said roller to provide tactile feedback to a user indicating that said locking mechanism is in a locking position.

13. A clamp, comprising:
a first jaw member having a camming surface;
a second jaw member pivotable with respect to said first jaw member;
a first biasing member biasing said first and second jaw members towards a clamping position; and
a locking mechanism comprising a roller for cooperating with said camming surface, and a second biasing member biasing said roller against said camming surface, whereby actuation of said locking mechanism biases said first and second jaw members to said clamping position and locks said first and second jaw members in said clamping position.

14. The clamp of claim 13, wherein said camming surface comprises a notch for receiving said roller to provide tactile feedback to a user indicating that said locking mechanism is in a locking position.

15. The clamp of claim 13, wherein said first jaw member comprises a first tab for actuating said first jaw member, and wherein said second jaw member comprises a second tab for actuating said second jaw member.

16. The clamp of claim 15, wherein said second tab supports said second biasing member.

17. The clamp of claim 15, wherein said first tab comprises said camming surface.

18. The clamp of claim 13, wherein said first jaw member has two camming surfaces, and said locking mechanism comprises two spaced rollers, each said spaced roller cooperating with a respective one of said two camming surfaces.

* * * * *

UNITED STATES PATENT AND TRADEMARK OFFICE
CERTIFICATE OF CORRECTION

| | | |
|---|---|---|
| PATENT NO. | : 11,433,355 B2 | Page 1 of 1 |
| APPLICATION NO. | : 16/094237 | |
| DATED | : September 6, 2022 | |
| INVENTOR(S) | : Greenizen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 951 days.

Signed and Sealed this
Eleventh Day of February, 2025

Coke Morgan Stewart
*Acting Director of the United States Patent and Trademark Office*